(12) United States Patent
Vanderbeek et al.

(10) Patent No.: US 8,764,506 B2
(45) Date of Patent: Jul. 1, 2014

(54) MANUALLY PIVOTING WINGS ON A TOY AIRPLANE

(75) Inventors: Jon Vanderbeek, Saugatuck, MI (US); Ryan Kratz, Oak Park, IL (US)

(73) Assignees: Sweet Spot Studio, Inc. MI (US); Sound Machine Invention & Design, Inc. IL (US)

( * ) Notice: Subject to any disclaimer, the term of this patent is extended or adjusted under 35 U.S.C. 154(b) by 424 days.

(21) Appl. No.: 13/283,737

(22) Filed: Oct. 28, 2011

(65) Prior Publication Data

US 2013/0109266 A1 May 2, 2013

(51) Int. Cl.
*A63H 27/00* (2006.01)

(52) U.S. Cl.
USPC .............................. 446/62; 446/68

(58) Field of Classification Search
CPC .............................. A63H 27/00; A63H 27/007
USPC ................. 446/15, 34, 49, 50–52, 54, 61–63, 446/66–68, 79, 80, 213, 216, 429, 487
See application file for complete search history.

(56) References Cited

U.S. PATENT DOCUMENTS

| | | | |
|---|---|---|---|
| 3,369,319 A | | 2/1968 | Brown |
| 3,408,767 A | * | 11/1968 | Anderson ................... 446/62 |
| 3,654,729 A | * | 4/1972 | Imperato ................... 446/62 |
| 3,839,818 A | * | 10/1974 | Heggedal ................... 446/62 |
| 3,916,560 A | | 11/1975 | Becker |
| 3,943,657 A | * | 3/1976 | Leckie ................... 446/62 |
| 4,458,442 A | | 7/1984 | McDaniel |
| 4,863,412 A | | 9/1989 | Mihalinec |
| 4,863,413 A | | 9/1989 | Schwarz |
| 4,915,664 A | * | 4/1990 | Bakker ................... 446/62 |
| 5,299,966 A | * | 4/1994 | Rose, III ................... 446/62 |
| 5,423,706 A | * | 6/1995 | Chase ................... 446/62 |
| 5,906,529 A | | 5/1999 | Spais |
| 7,713,105 B2 | | 5/2010 | Barthold |
| 7,722,426 B2 | | 5/2010 | Campbell |
| 7,777,165 B2 | | 8/2010 | Sanderson |
| 7,811,151 B2 | | 10/2010 | Conrad |
| 2006/0270307 A1 | | 11/2006 | Montalvo et al. |

\* cited by examiner

*Primary Examiner* — Nini Legesse

(74) *Attorney, Agent, or Firm* — Adam K. Sacharoff; Much Shelist

(57) ABSTRACT

An embodiment of the invention includes a flying vehicle having a fuselage, a pair of wings, the ability to manually apply a force against a portion of the wings causing the leading edge of each wing to sweep outwardly, the ability to mechanically holding the wings in a predetermined swept position, and the ability to bias the wings towards an initial inwardly swept position. A launcher rod with a rubber band is used to launch the vehicle.

18 Claims, 12 Drawing Sheets

MANUALLY PIVOTING WINGS ON A TOY AIRPLANE

BACKGROUND OF THE INVENTION

The background of the invention relates to flying toys. Flying toys have been developed for many years. Flying toys may have different flying characteristics, depending on the sweep of the wings. The wings can be slightly swept, moderately swept or highly swept. The slightly swept wing is designs to create more drag and is idea for gliding and slower speeds, the moderately swept wing designed for commercial jetliners and cruising airplanes, while the highly swept wing is designed for faster aircraft, like modern jet fights. The ability to have a single flying toy capable of various wing swept designs would be highly desirable and thus there is a need to provide for the same.

SUMMARY OF THE INVENTION

The present invention provides for numerous embodiments, of which of few are summarized. Numerous other advantages and features of the invention will become readily apparent from the detailed description of the invention and the embodiments thereof, from the claims, and from the accompanying drawings.

In a first embodiment there is provided a flying vehicle having a fuselage, a pair of wings, a means for manually applying a force against the a portion of the wings causing the leading edge of each wing to sweep outwardly, a means for mechanically holding the wings in a predetermined swept position, and a means for biasing the wings towards an initial inwardly swept position.

The fuselage may be further defined to include a top fuselage section and a bottom fuselage section. The top fuselage section has a tail section and a head section. The tail section has a knob extending rearwardly therefrom, and the head section further includes a pair of rods extending between the top and bottom fuselage sections. The fuselage further including a means for securing the bottom fuselage section and the head section of the top fuselage section to each other.

The wings are defined to each have a leading edge and a front end extending from a portion of the leading edge. The front end includes an opening sized to receive a rod, of the pair of rods. The front end further includes a rack with teeth, wherein when the wings are positioned on the rods the teeth align to mesh with each other. The front end further includes a notch adjacent thereto positioned to accommodate the securing means therethrough. Each wing further includes a terminal edge defined about each front end of the wing. The means for manually applying a force against the terminal edges of each front end of the wings towards the tail section of the fuselage is provided such that the wings pivot about the rods, causing the leading edge of each wing to sweep outwardly.

The means for securing the bottom fuselage section and the head section of the top fuselage section to each other may be defined as providing a centered opening in the top fuselage sized to receive a pin extending from the bottom fuselage section.

In another embodiment of the present invention the bottom fuselage section may further include a base having the pin extending therefrom to secure to the top fuselage section and the pair of rods extending therefrom to secure through the openings in the ends of the wings. In addition thereto, the bottom fuselage section may include a curved sectional member positioned at one end of the base. The curved section member includes a pair of opposing flanges extending inwardly across a portion of base. The wings when secured about the pair of rods have the terminal edges of each wing extend into the curved sectional member.

The means for manually applying a force against the terminal edges of each front end of the wings towards the tail section of the fuselage may be defined as including a helix screw, a nose cone, and an intermediate nose section. The helix screw has a circular end and a helical thread extending from the circular end. The circular end is positioned in the curved sectional member of the bottom fuselage section adjacent the terminal edges of each wing. The helical thread includes a key portion extending therefrom. The nose cone has a notch sized to receive the key portion such that the helix screw and nose cone a secured to each other and rotate as a single component. The intermediate nose section is positioned between the circular end of the helix screw and the nose cone. The intermediate nose section also includes an intermediate end secured to the top and bottom fuselage sections and includes a circular section extending from the intermediate end. The circular section is bored there-through accommodating the helical thread. Internally, the circular section further includes a projection permitting the helical thread to ride upwardly and downwardly through the circular section. As such when the nose cone is rotated, the helix screw rides through the intermediate nose section such that the circular end applies a force against the terminal edges of the wings causing the leading edge of each wing to sweep outwardly.

The means for mechanically holding the wings in a predetermined swept position may be defined by having at least one groove positioned on an interior surface of the nose cone and a detent positioned on an exterior surface of the circular section of the intermediate nose section. When the nose cone is rotated the at least one groove moves to engage the detent setting the wings in a predetermined swept position.

The means for biasing the wings towards an initial inwardly swept position may be defined by having a pair of springs, separately positioned about a rod, of the pair of rods. Each spring has one end positioned against one of the flanges and having another end positioned against a rail extending downwardly from the leading edge of the wing.

The means for manually launching the flying vehicle may be defined as providing a hook extending downwardly from the bottom fuselage portion, a launcher rod having a handle and a tip extending from a top portion thereof; and an elastic band being positioned about the tip and about the hook. A user is able to hold the handle in one hand and grasp the knob of the vehicle in the other hand, is able to pull the two away from each other, and is able to release the knob launching the vehicle.

DESCRIPTION OF THE DRAWINGS

A fuller understanding of the foregoing may be had by reference to the accompanying drawings, wherein.

DETAILED DESCRIPTION OF THE EMBODIMENTS

Figure 1:
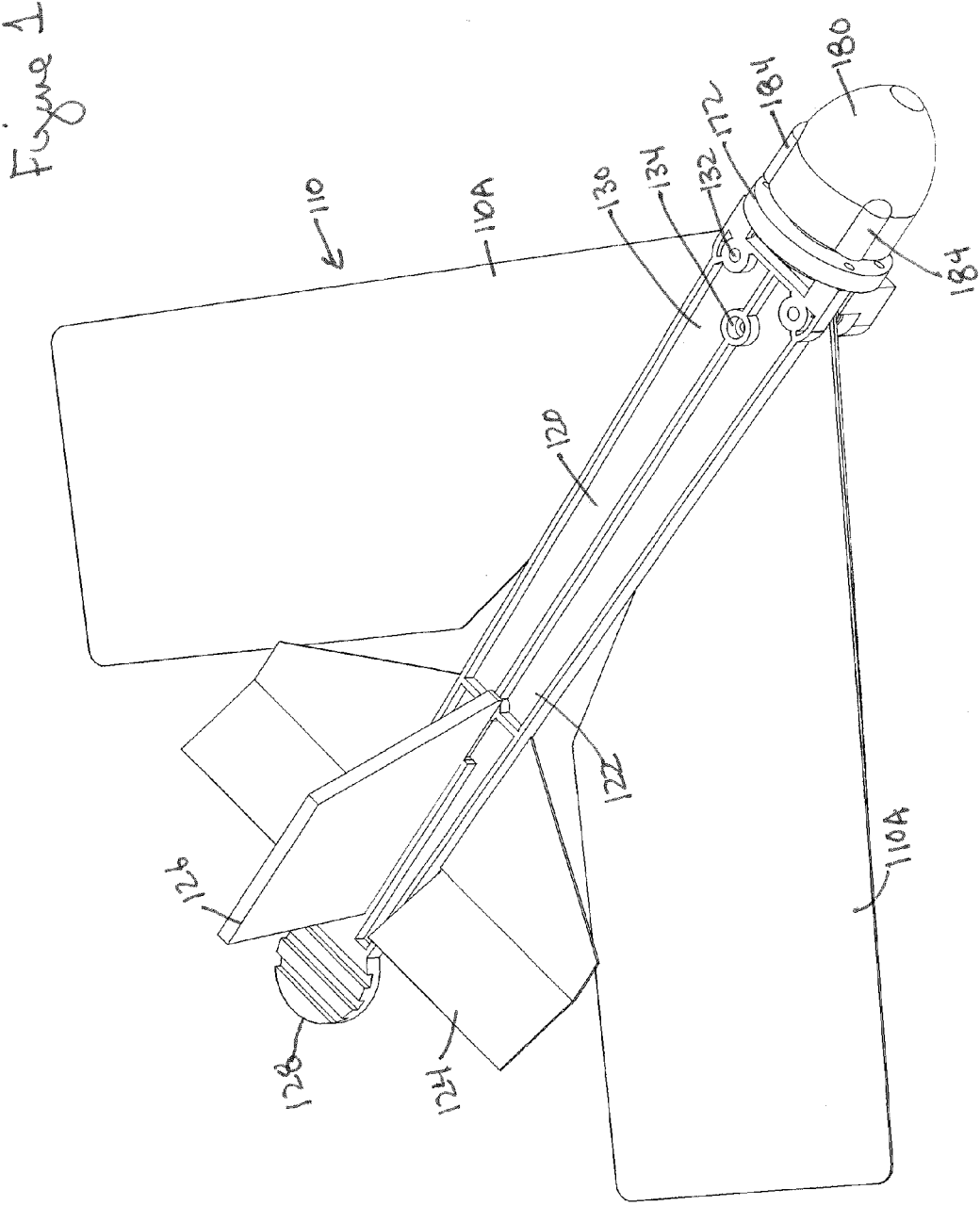
FIG. 1 is a top perspective view of a flying vehicle with manually pivoting wings in accordance to one embodiment of the present invention, illustrating the wings in a moderate swept configuration

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

Figure 2:
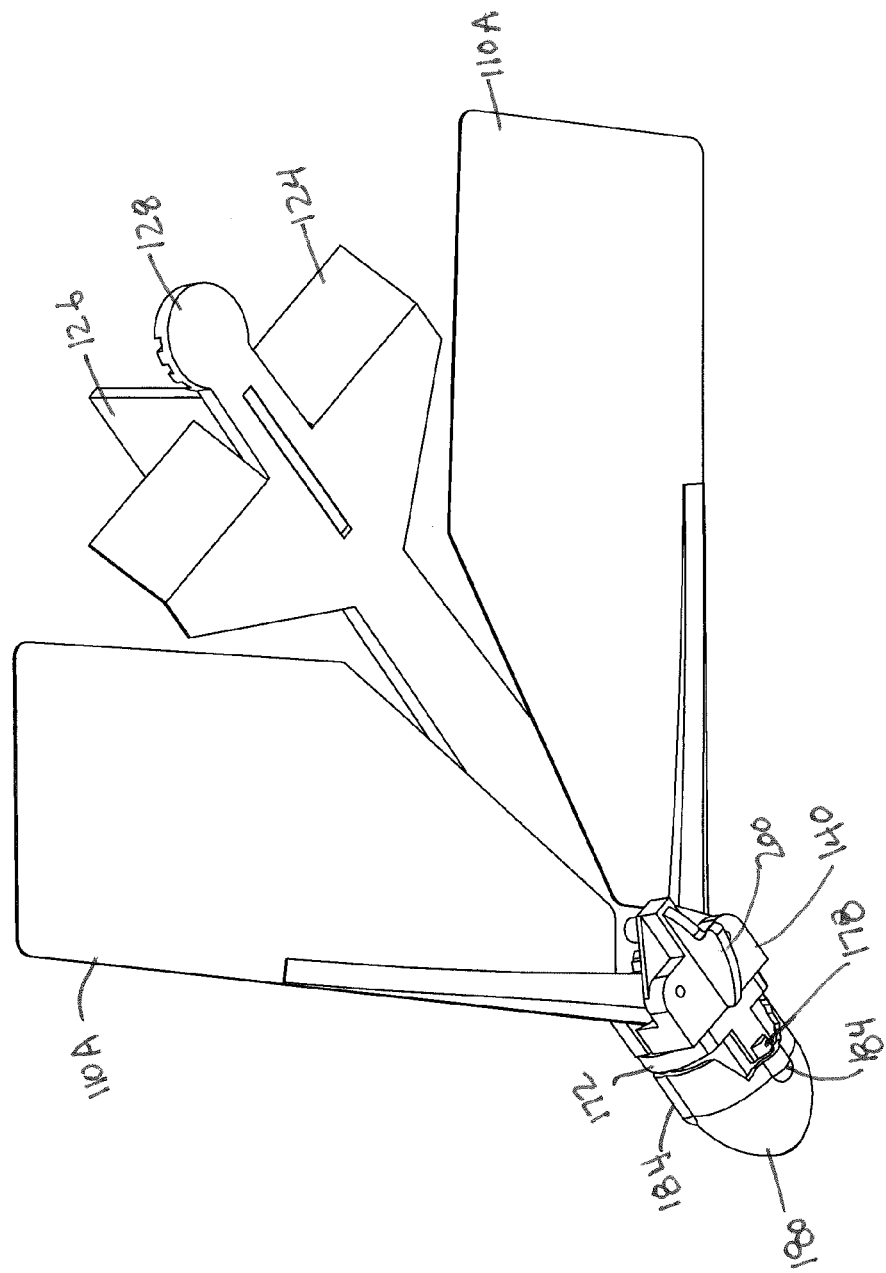
FIG. 2 is a bottom perspective of the flying vehicle from FIG. 1.
Figure 3:
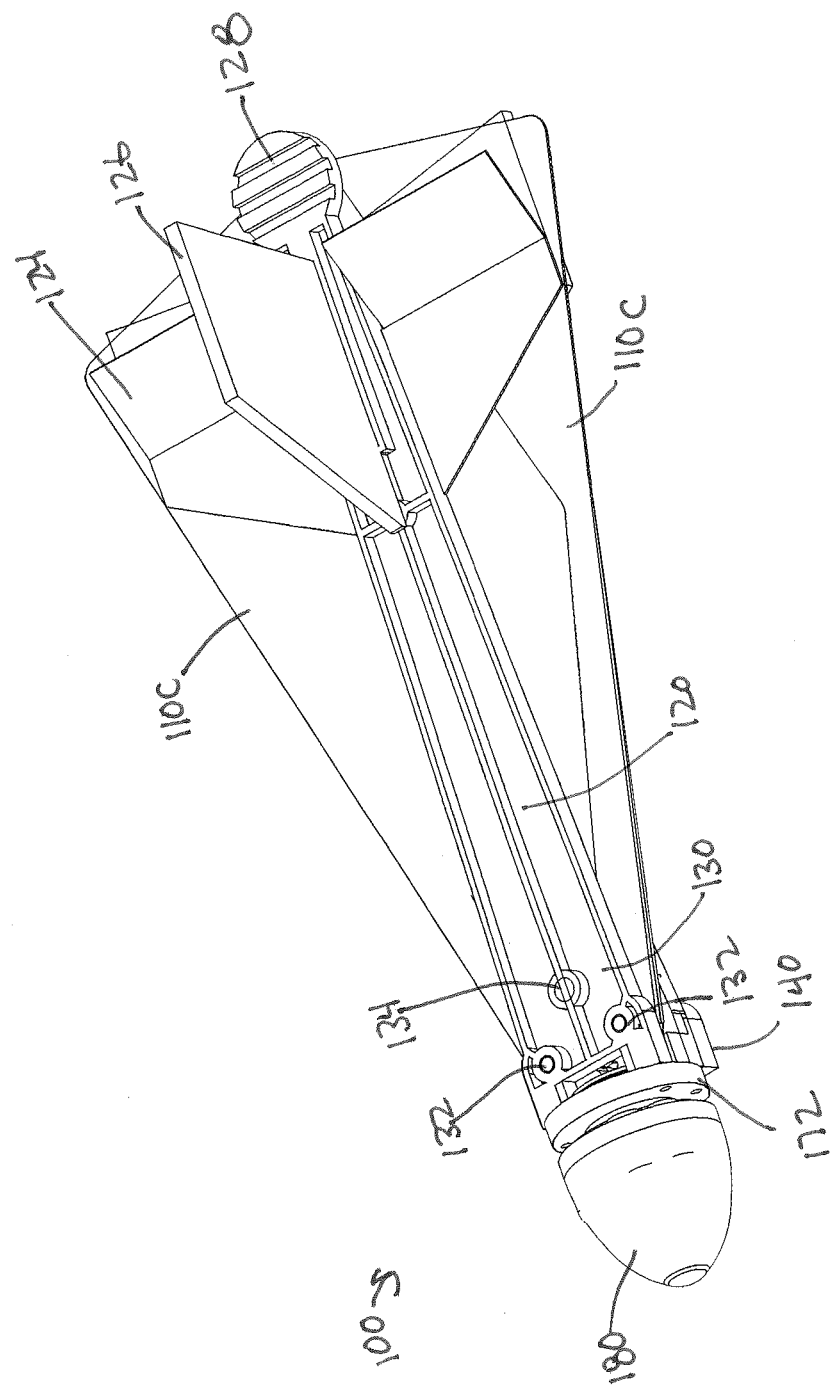
FIG. 3 is a top perspective view of the flying vehicle in FIG. 1, illustrating the wings in a folded configuration or a highly swept configuration.
Figure 4:
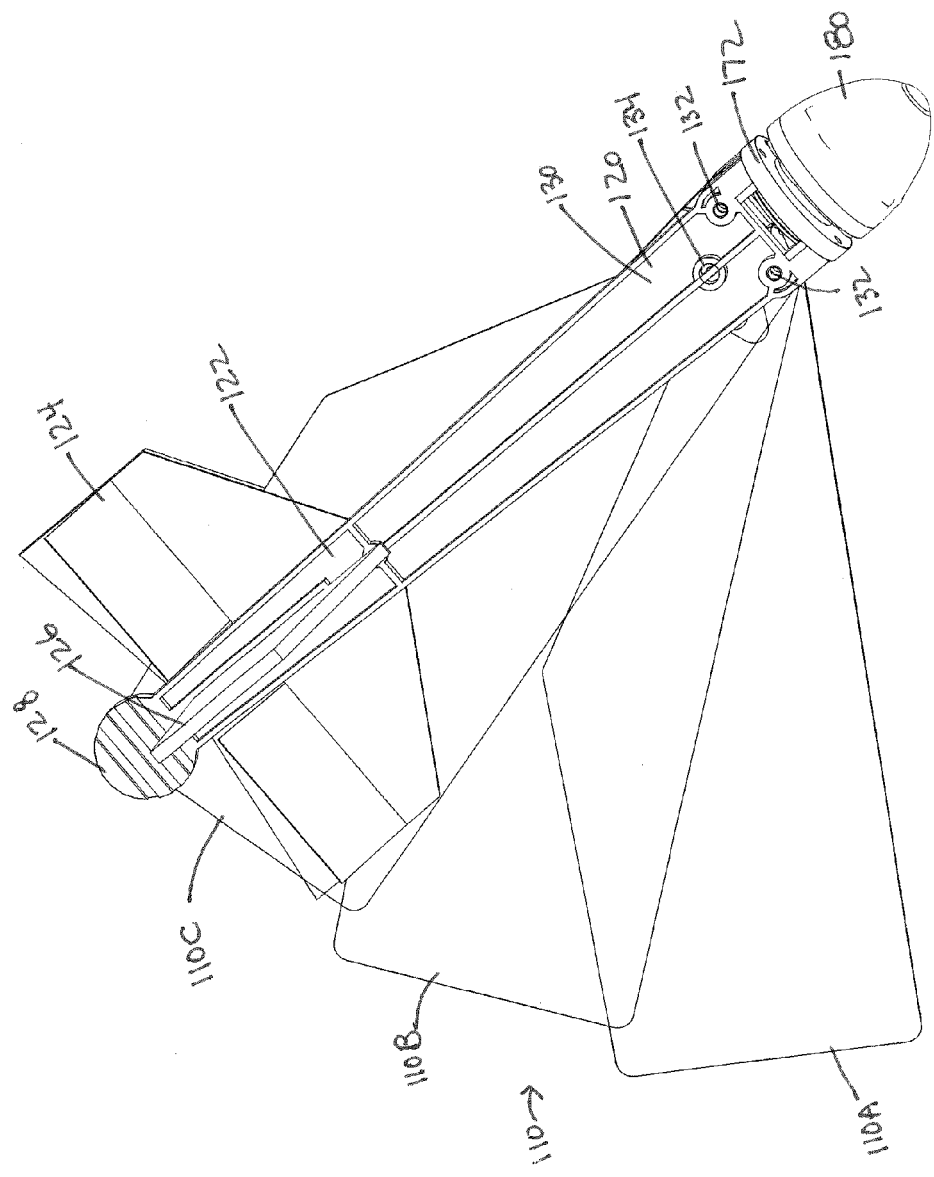
FIG. 4 is a top perspective view of the flying vehicle in FIG. 1, illustrating one of the wings moved to various swept positions.
Figure 5:
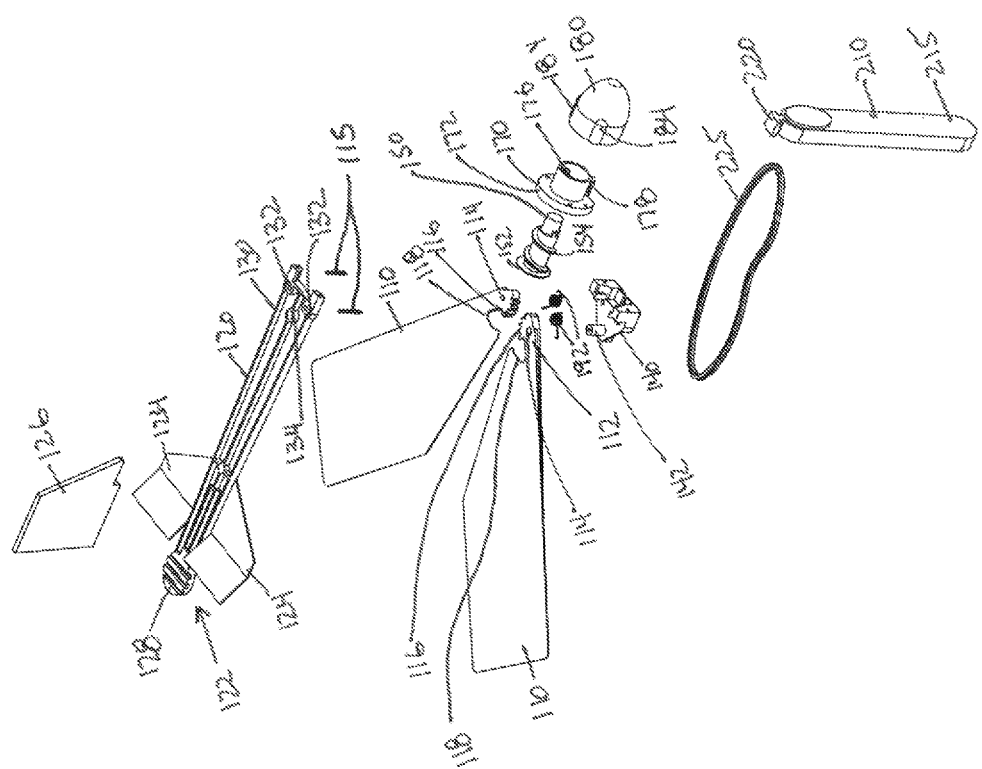
FIG. 5 is an exploded view of the flying vehicle from FIG. 1.
Figure 6:
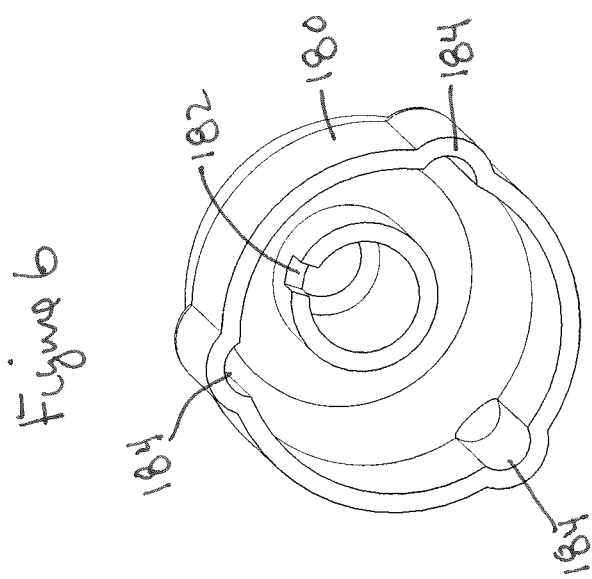
FIG. 6 is a inside view of a nose cone made in accordance to one embodiment of the present invention.
Figure 7:
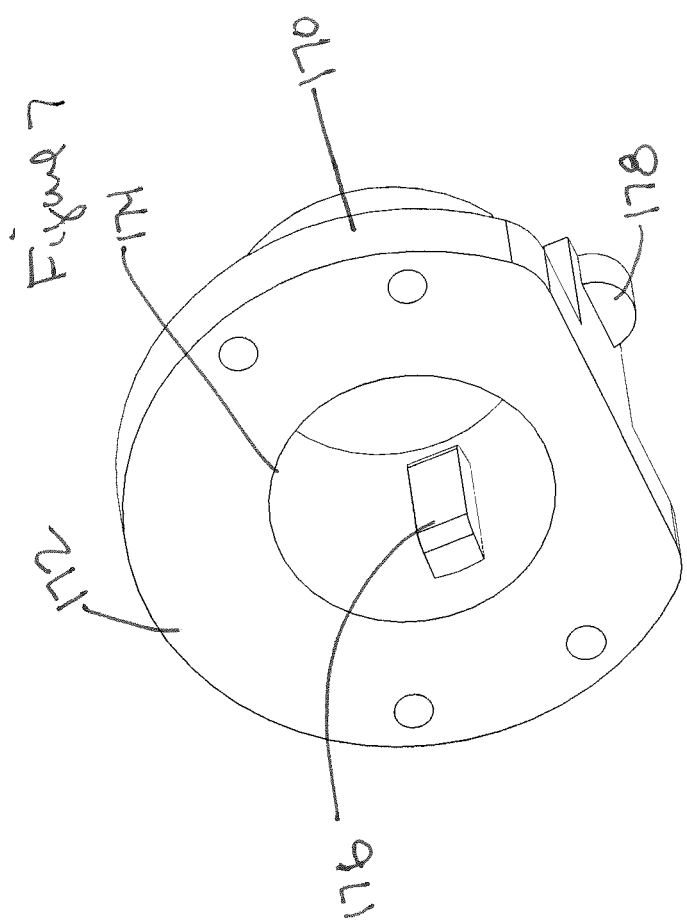
FIG. 7 is a perspective view of the intermediate nose section made in accordance to one embodiment of the present invention.
Figure 8:
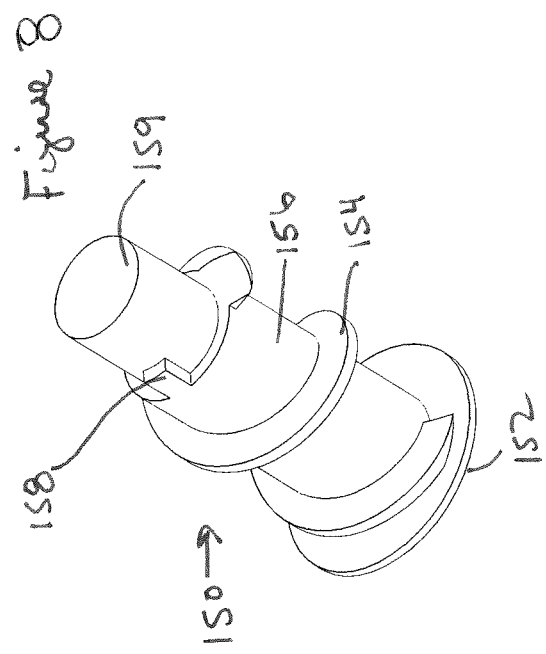
FIG. 8 is a perspective view of a helix screw, used to pivot the wings, made in accordance to one embodiment of the present invention.
Figure 9:
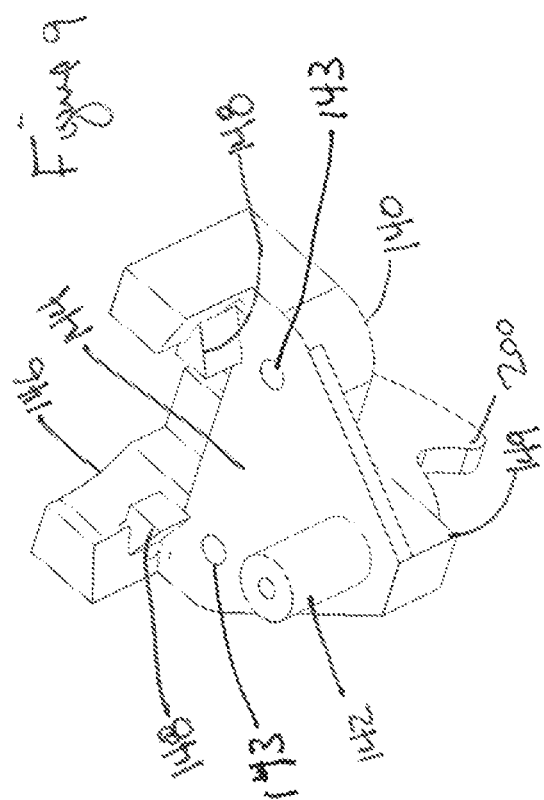
FIG. 9 is a perspective view of a bottom section member, used to secure and help pivot the wings, made in accordance to one embodiment of the present invention.
Figure 10:
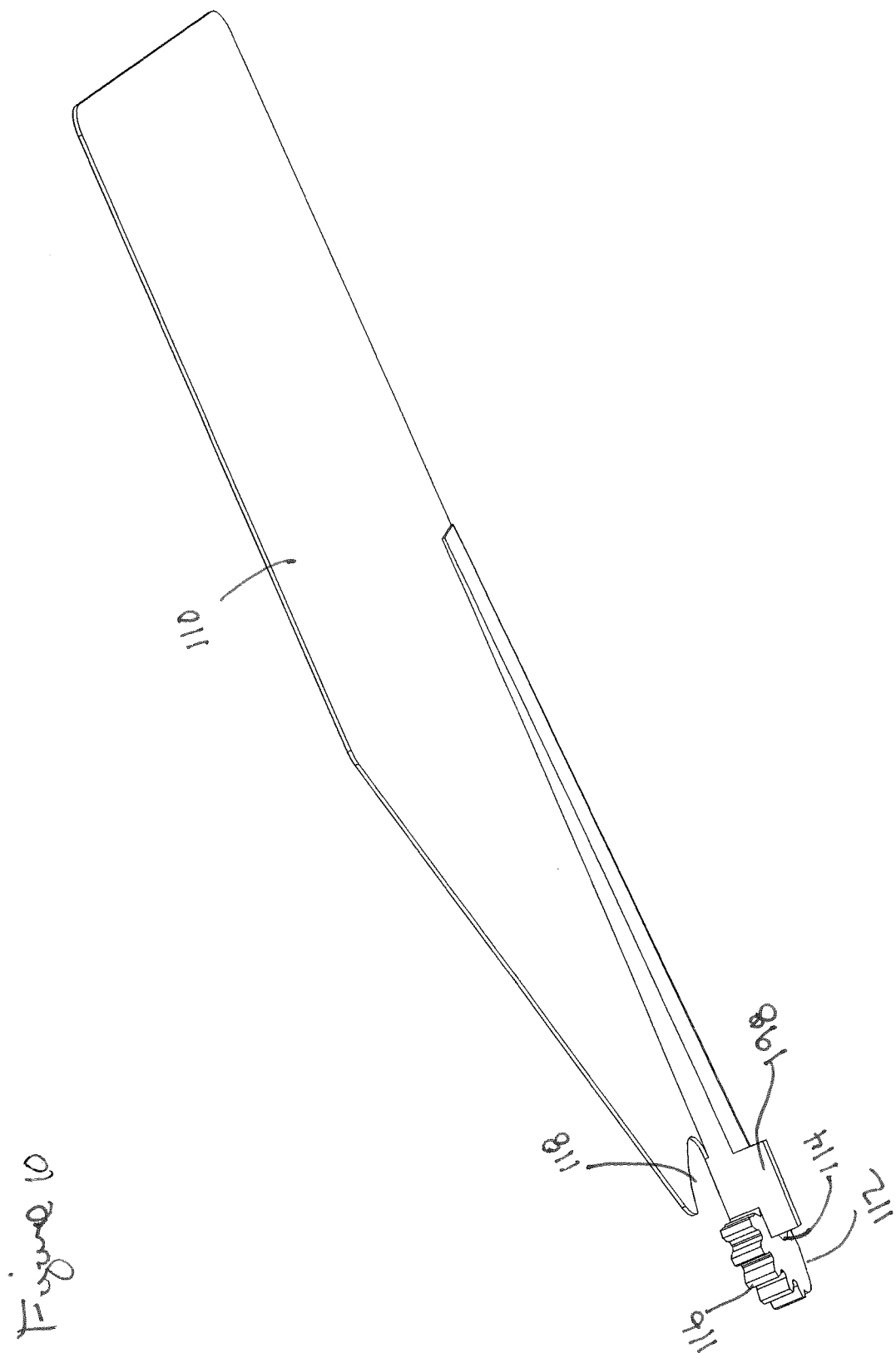
FIG. 10 is a angled bottom side profile of one of the wings made in accordance to one embodiment of the present invention.
Figure 11:
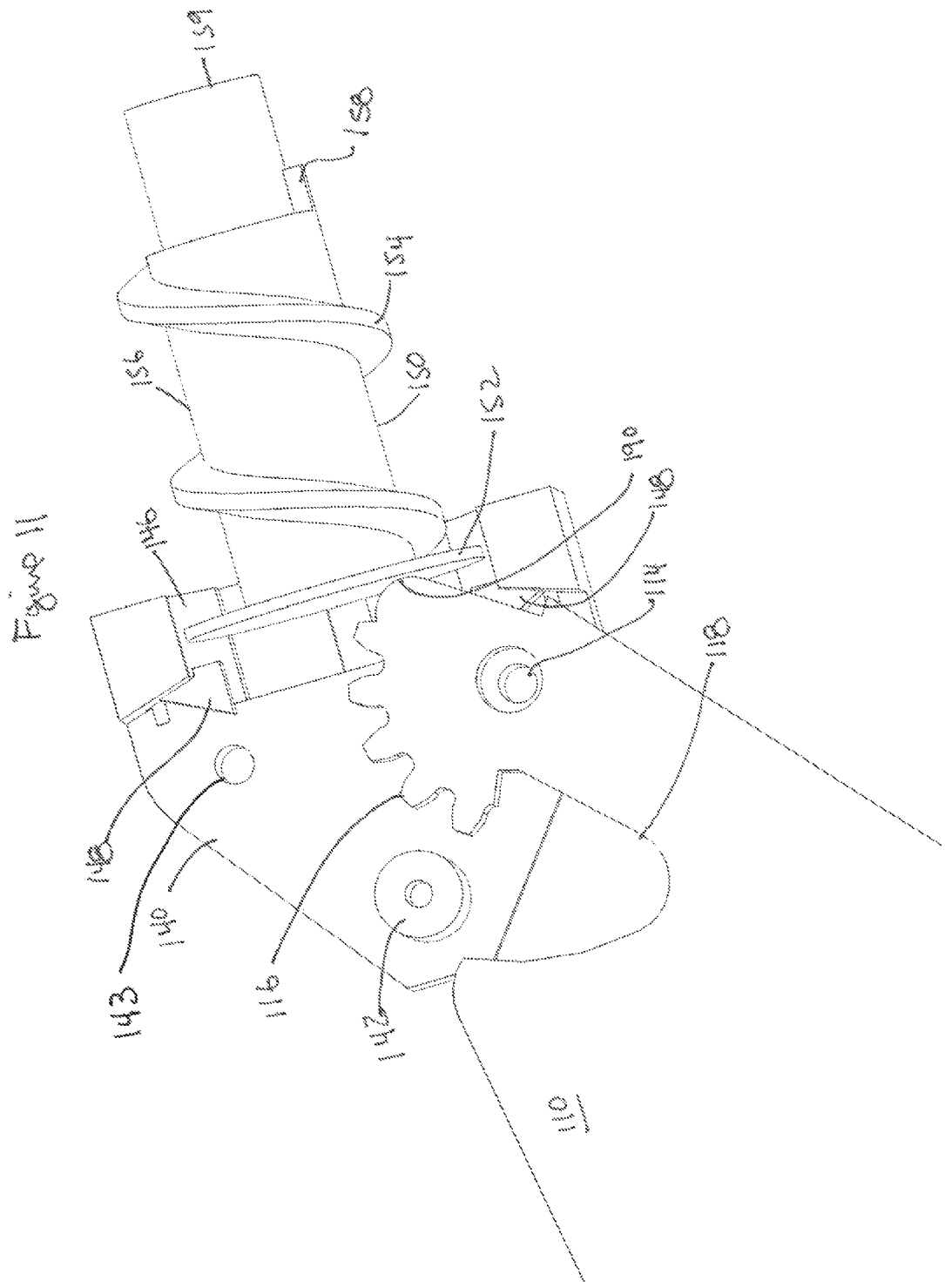
FIG. 11 is a enlarged sectional view of some of the assembled components used to move the wings.
Figure 12:
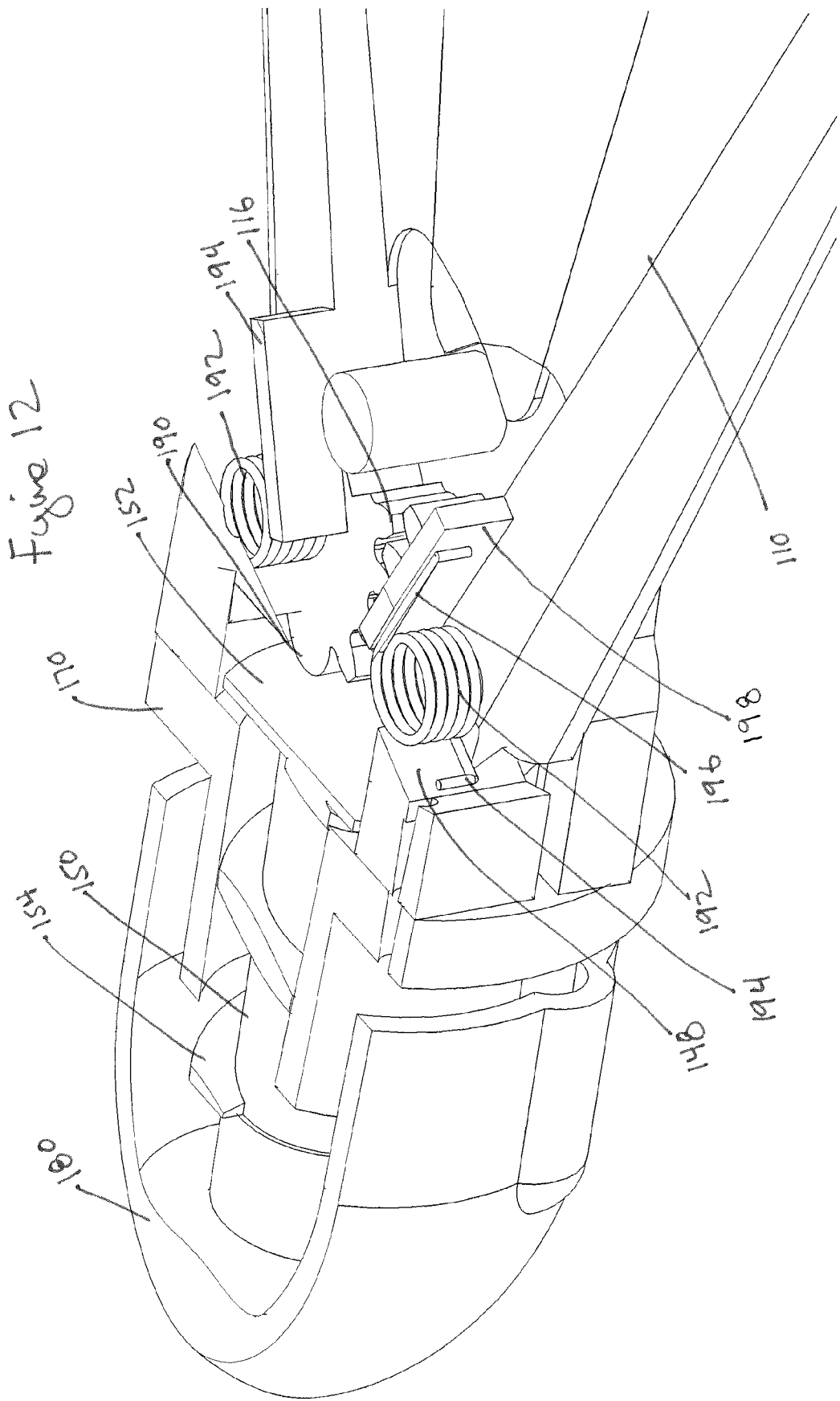
FIG. 12 is a sectional view of the some of the assembled components.

Referring now to FIGS. 1-12, there is shown an flying vehicle 100 assembled from various components that will be further discussed below. The flying vehicle 100 include manually pivoting wings 110 that may be manually adjusted and locked into a position before flying. The wings 110 once positioned will stay in their position during the duration of the flight and until the user manually pivots the wings to a different position. As noted above, the position of the wings 110 may be moved to different swept positions, such as, slightly swept 110A, moderately swept 110B, or highly swept 110C. The highly swept 110C may also be a position similar to a closed position used for storage or packaging in the stores because the profile becomes very streamlined narrow and easy to package and transport.

The vehicle 110 includes a top fuselage section 120 with a tail section 122 and a head section 130. The tail section 122 has a pair of extending rear elevators 124 and a vertical stabilizer 126 designed conventionally to help stabilize the flight of the vehicle 100. A flat knob 128 is further provided behind the tail section 122 designed to be grasped by a user while the wings are being moved and during launching of the vehicle. The head section 130 includes a pair of female receivers 132 adapted to accommodate male pins 115 extending from a bottom fuselage section 140. It being well noted that the male and female components can be reversed without changing the scope of the invention, as these male and female components only serve as a means for pivotally capturing an end 112 of the wings. The head section 130 further includes a centered opening 134 sized to receive a pin 142 extending from the bottom fuselage section 140 to aid in securing the top fuselage section 120 thereto.

To pivotally capture each wing 110, an end 112 of the wing includes an opening 114 sized to receive the male pins 115 extending. The end 112 of each wing further includes a rack 116 with teeth that mesh to wings 110 together, such that the movement of the wings are simultaneous and even helping to prevent one wing to be at a swept angle different then the other wing. Nearly adjacent to the end 112 of each wing is a notch 118 that permits each wing to pivot towards the center with a space to accommodate the pin 142 connecting the top fuselage section 120 to the bottom section member 140.

The bottom fuselage section 140 includes a base 144 with the extending pin 142 to secure to the top fuselage section 120 and openings 143 to receive the male pins 115 which secure through the openings 114 in the wings 110. At one end of the base 144, the bottom fuselage section 140 further includes a curved sectional member 146 with a pair of opposing flanges 148 extending inwardly towards the base 144. Lastly the bottom fuselage section 140 has a hook 200 extending from the lower end 149 thereof. The curved section member 146 of the bottom fuselage section 140 accommodates a portion of the circular end 152 defined in the helix screw 150.

The helix screw 150 includes the circular end 152 and a helical thread 154 that extends around a finger 156 extending from the circular end 152. The finger 156 further includes a key 158 sized to fit within a notch 182 in a nose cone 180. The end 159 of the finger 156 is secured to the nose cone 180 with the projecting key 158 fitting within the notch 182, such that when the nose cone 180 rotates the helix screw 150 also rotates. The nose cone 180 further includes a number of grooves 184 spaced around the perimeter thereof. The grooves 184 are positioned to engage a detent 172 extending from an intermediate nose section 170.

The intermediate nose section 170 is positioned between the helix screw 150 and nose cone 180 and includes one end 172 secured to the top fuselage and bottom fuselage sections 120 and 140. The intermediate nose section 170 includes a circular section 174 extending from the end 172 and bored through to accommodate the helical thread 154 of the helix screw 150. Inside the bored circular section 174 is a projection 176 sized such that the thread 154 can ride around the projection 176 and move upwardly and downwardly through the intermediate nose section 170. Externally positioned on the circular section 174 is a detent 178 which fits into the grooves 184 on the nose cone 180 when the nose cone 180 is rotated an alignment between one of the grooves 184 and the detent is achieved. This as explained below also locks the position of the wings in one of the predetermined swept positioned.

When assembly, the wings 110 are pivotally secured between the top and bottom fuselage sections with the racks 116 engaged with each other. As the nose cone 180 is turned, the helix screw 150 will turn and slide through the intermediate nose section 180 about the projection 176 that is internal to the circular section 175. Moving through the intermediate nose section 180, the helix screw 180 will also move the circular end 152 through the curved section member 146 of the bottom fuselage section 140. The circular end 152 is also positioned against a terminal edge 190 at the end of the rack 116. When the circular end 152 is moved towards the wings, the circular end 152 pushes the terminal edges 190 causes the wings to pivot to a greater swept position. Once the detent 178 is aligned with one of the grooves 184 in the nose cone 180, the wings lock into position. With a slight force in the continued rotation, the detent 178 will move out of alignment and will be allowed to move to another groove.

While rotation in one direction will cause the circular end to move towards the wings, conversely, when the circular end is moved away from the wings, the terminal edge 190 needs to maintain contact with the circular end. This is accomplished with springs 192 separately biasing the wings towards the center, thereby acting to move the terminal edges towards the nose cone or the wings to its initial folded or highly swept position.

The springs 192 are positioned around the male pins extending from the bottom fuselage section 140 and include two opposing ends. The first end 194 is positioned against the opposing flange 148 defined by the curved sectional member 146 and the second end 196 is positioned against a rail 198, which extends downwardly from a leading edge of the wing 110.

When assembled, the user can rotate the nose cone to position the wings in a desired swept position. A launcher rod 210 is provided with a handle 215 and a tip 220 extending from the top portion. A rubber band 225 or elastic band can be positioned about the tip and the hook 200. A user can hold the handle 215 in one hand and grasp the knob 128 in the other hand. Pulling the two away from each other, the rubber band 225 will stretch storing a large amount of potential energy. Once the knob is released, the rubber band 225 transfers the potential energy in the rubber band to kinetic energy of the flying vehicle allowing it to fly through the air.

It should be further stated the specific information shown in the drawings but not specifically mentioned above may be ascertained and read into the specification by virtue of a simple study of the drawings. Moreover, the invention is also not necessarily limited by the drawings or the specification as structural and functional equivalents may be contemplated and incorporated into the invention without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A flying vehicle comprising:
    a fuselage defined as having a top fuselage section and a bottom fuselage section, the top fuselage section having a tail section and a head section, the tail section having a knob extending rearwardly therefrom, the fuselage further including a pair of pins extending between the top and bottom fuselage sections, and the fuselage further including a means for securing the bottom fuselage section and the head section of the top fuselage section to each other;
    a pair of wings, each wing having a leading edge and a front end extending from a portion of the leading edge, the front end including an opening sized to receive a rod, of the pair of pins, the front end further including a rack with teeth, wherein when the wings are positioned on the rods the teeth align to mesh with each other, the front end further including a notch adjacent thereto positioned to accommodate the securing means therethrough, and further providing a terminal edge defined about each front end of the wing;
    a means for manually applying a force against the terminal edges of each front end of the wings towards the tail section of the fuselage, such that the wings pivot about the rods, causing the leading edge of each wing to sweep outwardly;
    a means for mechanically holding the wings in a predetermined swept position; and
    a means for biasing the wings towards an initial inwardly swept position.

2. The flying vehicle of claim 1, wherein the means for securing the bottom fuselage section and the head section of the top fuselage section to each other is defined as providing a centered opening in the top fuselage sized to receive a base pin extending from the bottom fuselage section.

3. The flying vehicle of claim 2, wherein the bottom fuselage section further includes:
    a base having the base pin extending therefrom to secure to the top fuselage section;
    the pair of pins extending therefrom to secure through the openings in the ends of the wings; and
    a curved sectional member positioned at one end of the base, the curved section member includes a pair of opposing flanges extending inwardly across a portion of base, and
    wherein when the wings are secured about the pair of pins, the terminal edges of each wing extend into the curved sectional member.

4. The flying vehicle of claim 3, wherein the means for manually applying a force against the terminal edges of each front end of the wings towards the tail section of the fuselage comprises:
    a helix screw having a circular end and a helical thread extending from the circular end, the circular end being positioned in the curved sectional member of the bottom fuselage section adjacent the terminal edges of each wing, and the helical thread includes a key portion extending therefrom and an top portion;
    a nose cone having a notch sized to receive the key portion such that the helix screw and nose cone a secured to each other and rotate as a single component;
    an intermediate nose section positioned between the circular end of the helix screw and the nose cone, the intermediate nose section includes an intermediate end secured to the top and bottom fuselage sections and includes a circular section extending from the intermediate end, the circular section is bored there-through accommodating the helical thread, the circular section further includes an internally positioned projection permitting the helical thread to ride upwardly and downwardly through the circular section, and
    wherein when the nose cone is rotated, the helix screw rides through the intermediate nose section such that the circular end applies a force against the terminal edges of the wings causing the leading edge of each wing to sweep outwardly.

5. The flying vehicle of claim 4, wherein the means for mechanically holding the wings in a predetermined swept position is defined by including:
    at least one groove positioned on an interior surface of the nose cone, and
    a detent positioned on an exterior surface of the circular section of the intermediate nose section, wherein when the nose cone is rotated the at least one groove moves to engage the detent setting the wings in a predetermined swept position.

6. The flying vehicle of claim 3, wherein the means for biasing the wings towards an initial inwardly swept position includes:
    a pair of springs, separately positioned about a rod, of the pair of pins, each spring having one end positioned against one of the flanges and having another end positioned against a rail extending downwardly from the leading edge of the wing.

7. The flying vehicle of claim 1 further comprising a means for manually launching the flying vehicle, wherein the manually launching means includes:

a hook extending downwardly from the bottom fuselage portion;

a launcher rod having a handle and a tip extending from a top portion thereof; and an elastic band being positioned about the tip and about the hook, wherein a user is able to hold the handle in one hand and grasp the knob of the vehicle in the other hand, is able to pull the two away from each other, and is able to release the knob launching the vehicle.

8. The flying vehicle of claim 1, wherein the tail section includes a pair of rear elevators and a vertical stabilizer.

9. A flying vehicle comprising:

a fuselage defined as having a top fuselage section and a bottom fuselage section, the top fuselage section having a tail section and a head section, the tail section having a knob extending rearwardly therefrom, the fuselage further including a pair of pins extending between the top and bottom fuselage sections;

a pair of wings, each wing having a leading edge and a front end extending from a portion of the leading edge, the front end including an opening sized to receive a rod, of the pair of pins, the front end further including a rack, such that when the wings are positioned on the rods the racks mesh with each other;

a means for manually applying a force against the front end of each wing towards the tail section of the fuselage, such that the wings pivot about the rods, causing the leading edge of each wing to sweep outwardly;

a means for mechanically holding the wings in a predetermined swept position; and a means for biasing the wings towards an initial inwardly swept position.

10. The flying vehicle of claim 9, wherein the bottom fuselage section further includes:

a base having a base pin extending therefrom to secure to the top fuselage section; and a curved sectional member positioned at one end of the base, the curved section member includes a pair of opposing flanges extending inwardly portion of base, and wherein when the wings are secured about the pair of pins, the a portion of the front end of each wing extends into the curved sectional member.

11. The flying vehicle of claim 10, wherein the means for manually applying a force against the each front end of the wings towards the tail section of the fuselage comprises:

a nose cone having a notch;

a helix screw having a circular end and a helical thread extending from the circular end, the circular end being positioned in the curved sectional member of the bottom fuselage section adjacent the portion of the front ends of each wing, the helical thread includes a key portion extending therefrom and a top portion, the top portion being secured to the nose cone such that the key portion is received in the notch, wherein when the nose cone rotates, the helix screw rotates;

an intermediate nose section positioned between the circular end of the helix screw and the nose cone, the intermediate nose section includes an intermediate end secured to the top and bottom fuselage sections and includes a circular section extending from the intermediate end, the circular section is bored there-through accommodating the helical thread, the circular section further includes an internally positioned projection permitting the helical thread to ride against the projection upwardly and downwardly through the circular section, and wherein when the nose cone is rotated, the helix screw rides through the intermediate nose section such that the circular end applies a force against the portions of the front ends of each wing causing the leading edge of each wing to sweep outwardly.

12. The flying vehicle of claim 11, wherein the means for mechanically holding the wings in a predetermined swept position is defined by including:

at least one groove positioned on an interior surface of the nose cone, and a detent positioned on an exterior surface of the circular section of the intermediate nose section, wherein when the nose cone is rotated the at least one groove moves to engage the detent setting the wings in a predetermined swept position.

13. The flying vehicle of claim 12, wherein the means for biasing the wings towards an initial inwardly swept position includes:

a pair of springs, separately positioned about a rod, of the pair of pins, each spring having one end positioned against one of the flanges and having another end positioned against a rail extending downwardly from the leading edge of the wing.

14. The flying vehicle of claim 9 further comprising a means for manually launching the flying vehicle, wherein the manually launching means includes:

a hook extending downwardly from the bottom fuselage portion;

a launcher rod having a handle and a tip extending from a top portion thereof; and an elastic band being positioned about the tip and about the hook, wherein a user is able to hold the handle in one hand and grasp the knob of the vehicle in the other hand, is able to pull the two away from each other, and is able to release the knob launching the vehicle.

15. A flying vehicle comprising:

a pair of wings, each wing having a leading edge and a front end extending from a portion of the leading edge, the front end including an opening;

a fuselage defined as having a top fuselage section and a bottom fuselage section, the top fuselage section having a tail section and a head section, the tail section having a knob extending rearwardly therefrom, the fuselage further including a pair of pins extending between the top and bottom fuselage sections, the bottom fuselage section further includes, a base having a pin extending therefrom to secure to the top fuselage section, a curved sectional member positioned at one end of the base, the curved section member includes a pair of opposing flanges extending inwardly across a portion of base, and wherein each rod sized to separately receive the opening of the wing and positioned such that when the wings are positioned on the rods the racks mesh with each other and a portion of the front end of each wing extends into the curved sectional member;

a nose cone having a notch;

a helix screw having a circular end and a helical thread extending from the circular end, the circular end being positioned in the curved sectional member of the bottom fuselage section adjacent the portion of the front ends of each wing, the helical thread includes a key portion extending therefrom and a top portion, the top portion being secured to the nose cone such that the key portion is received in the notch, wherein when the nose cone rotates, the helix screw rotates; and an intermediate nose section positioned between the circular end of the helix screw and the nose cone, the intermediate nose section includes an intermediate end secured to the top and bottom fuselage sections and includes a circular section extending from the intermediate end, the circular section is bored there-through accommodating the helical thread, the circular section further includes an internally positioned projection permitting the helical thread to ride against the projection upwardly and downwardly through the circular section, wherein when the nosecone is rotated, the helix screw rides through the intermediate nose section such that the circular end applies a force against the portions of the front ends of each wing causing the leading edge of each wing to sweep outwardly.

16. The flying vehicle of claim 15 further comprising a means for mechanically holding the wings in a predetermined swept position defined by including:
   at least one groove positioned on an interior surface of the nose cone, and
   a detent positioned on an exterior surface of the circular section of the intermediate nose section, wherein when the nose cone is rotated the at least one groove moves to engage the detent setting the wings in a predetermined swept position.

17. The flying vehicle of claim 16 further comprising a means for biasing the wings towards an initial inwardly swept position defined by including a pair of springs, separately positioned about a rod, of the pair of pins, each spring having one end positioned against one of the flanges and having another end positioned against a rail extending downwardly from the leading edge of the wing.

18. The flying vehicle of claim 15 further comprising a means for manually launching the flying vehicle, wherein the manually launching means includes:
   a hook extending downwardly from the bottom fuselage portion;
   a launcher rod having a handle and a tip extending from a top portion thereof; and
   an elastic band being positioned about the tip and about the hook, wherein a user is able to hold the handle in one hand and grasp the knob of the vehicle in the other hand, is able to pull the two away from each other, and is able to release the knob launching the vehicle.

* * * * *